(12) United States Patent  (10) Patent No.: US 7,428,110 B2
Tamada et al.  (45) Date of Patent: Sep. 23, 2008

(54) OPTICAL PART HOLDING UNIT

(75) Inventors: Tamotsu Tamada, Hidaka (JP);
 Kazunori Nomi, Ishikawa (JP); Shigeru Sakamoto, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 10/589,606

(22) PCT Filed: Feb. 17, 2005

(86) PCT No.: PCT/JP2005/002435

§ 371 (c)(1),
(2), (4) Date: May 21, 2007

(87) PCT Pub. No.: WO2005/078500

PCT Pub. Date: Aug. 25, 2005

(65) Prior Publication Data

US 2007/0286557 A1  Dec. 13, 2007

(30) Foreign Application Priority Data

Feb. 17, 2004  (JP) ............................. 2004-040396

(51) Int. Cl.
 *G02B 7/02* (2006.01)
(52) U.S. Cl. ...................... 359/811; 359/819; 359/823; 353/101
(58) Field of Classification Search ................. 359/811, 359/819, 823, 618, 694–703, 557, 376, 462, 359/380, 825, 422, 426, 626, 636; 396/71, 396/79, 134, 144, 298, 448, 529; 353/100, 353/101; 385/53, 76, 78; 439/68, 70, 607; 348/335

See application file for complete search history.

(56) References Cited

U.S. PATENT DOCUMENTS 4,251,134 A * 2/1981 Sato et al. .................. 359/828
4,320,951 A * 3/1982 Kawai ........................ 396/71
4,336,991 A * 6/1982 Isobe ......................... 396/298
5,249,082 A * 9/1993 Newman .................... 359/813
5,333,024 A * 7/1994 Labaziewicz ............... 396/79

(Continued)

FOREIGN PATENT DOCUMENTS

EP  0 901 023  10/1999

(Continued)

*Primary Examiner*—Loha Ben
(74) *Attorney, Agent, or Firm*—Drinker Biddle & Reath LLP

(57) ABSTRACT

It is an object to provide an optical component holding unit whereby the positioning accuracy can be improved while reducing cost through facilitated assembling and ensuring reproducibility.

The fitting between a cross-sectionally noncircular-shaped rectangular convex portion 8a and a rectangular hole and the fitting between a cross-sectionally circular-shaped circular convex portion 11a and a circular hole, which surround or form opening portions 22a and 22b for allowing passage of light, guide adjacent optical component holding units 35 to predetermined positions and couples the units detachably to each other for positioning in the three-dimensional direction, while the fitting between the rectangular convex portion 8a and the rectangular hole and the fitting between spring pins 13a and fitting holes restrain the adjacent optical component holding units 35 relatively in the rotation direction for positioning in the rotation direction.

10 Claims, 10 Drawing Sheets

U.S. PATENT DOCUMENTS

| | | | |
|---|---|---|---|
| 5,349,476 A * | 9/1994 | Burnham et al. | 359/699 |
| 6,034,821 A | 3/2000 | Schenfeld et al. | 359/618 |
| 6,400,516 B1 * | 6/2002 | Spinali | 359/819 |
| 6,547,402 B2 * | 4/2003 | Masuda | 353/101 |
| 6,657,797 B2 * | 12/2003 | Menard | 359/819 |
| 6,832,725 B2 * | 12/2004 | Gardiner et al. | 235/462.21 |

FOREIGN PATENT DOCUMENTS

| | | |
|---|---|---|
| JP | 9-274124 | 10/1997 |
| JP | 11-64765 | 3/1999 |
| JP | 3134850 | 12/2000 |
| JP | 2002-252401 | 9/2002 |
| JP | 2003-15070 | 1/2003 |
| JP | 2004-12844 | 1/2004 |

* cited by examiner

OPTICAL PART HOLDING UNIT

TECHNICAL FIELD

The present invention relates to an optical component holding unit.

BACKGROUND ART

Conventional optical systems are constructed by arranging optical components such as prisms, lenses, mirrors, LDs, and/or CCDs in predetermined positions. In such optical systems, since the relative positions and angles between the optical components are required to be accurate to align the optical axes thereof, specialized jigs and positioning mechanisms, etc., are used for positioning. Also, there is already known an optical system composed of prisms in which the prisms each provided with a fitting pin are coupled to each other for positioning (refer to Patent Document 1, for example).

Patent Document 1: Japanese Patent No. 3134850

DISCLOSURE OF THE INVENTION

Problem To Be Solved By the Invention

However, in the case of using conventional positioning mechanisms, etc., for positioning, there are problems that it is difficult to adjust the positions of optical components, and that if the number of optical components is increased, the positional adjustment becomes complicated, resulting in an increase in production cost. There is a further problem that when replacing the optical components, an additional positional adjustment is required.

Also, in the case of coupling prisms each provided with a fitting pin to each other for positioning, the positioning can be carried out easily but falls short of accuracy, further improvement in accuracy is expected.

The present invention has been made to solve the above-described problems, and an object thereof is to provide an optical component holding unit whereby the positioning accuracy can be improved while reducing cost in assembling and ensuring reproducibility.

Means For Solving Problem

An optical component holding unit according to the present invention is capable of housing and holding an optical component, including: an opening portion for allowing passage of light and a fitting shape capable of coupling optical component holding units adjacent in the direction of the light detachably to each other, the fitting shape including: a positioning fitting shape for forming or surrounding the opening portion to position the optical component holding units with respect to each other; and an anti-rotation fitting shape for preventing relative rotation between the optical component holding units.

In accordance with the thus arranged optical component holding unit, the positioning fitting shape guides adjacent optical component holding units to predetermined positions and couples the units detachably to each other for positioning in the three-dimensional direction, while the anti-rotation fitting shape restrains the adjacent optical component holding units relatively in the rotation direction for positioning in the rotation direction.

Here, in order to exhibit the foregoing effect, there can specifically be cited an arrangement in which the positioning fitting shape and the anti-rotation fitting shape include a cross-sectionally noncircular-shaped noncircular hole or noncircular convex portion for forming or surrounding the opening portion. This allows the optical component holding units to be positioned relatively in the three-dimensional direction as well as in the rotation direction to be coupled detachably to each other.

Furthermore, in order to exhibit the foregoing effect, there can specifically be cited an arrangement in which the positioning fitting shape includes a cross-sectionally circular-shaped circular hole or circular convex portion for forming or surrounding the opening portion, and the anti-rotation fitting shape includes at least either a fitting pin or a fitting hole. This allows the optical component holding units to be positioned relatively in the three-dimensional direction as well as in the rotation direction to be coupled detachably to each other.

Also, in addition to the noncircular hole or noncircular convex portion, if the positioning fitting shape further includes a cross-sectionally circular-shaped circular hole or circular convex portion for forming or surrounding the opening portion, the positioning in the three-dimensional direction can be carried out more reliably.

Furthermore, if the anti-rotation fitting shape further includes at least either a fitting pin or a fitting hole, the positioning in the rotation direction can be carried out more reliably.

Here, if the optical component holding unit is a block body, the optical component holding units can be arranged accurately with respect to predetermined reference planes.

Further, if the optical component holding unit includes: an insertion port capable of inserting the optical component therethrough; and a cover for opening and closing the insertion port, the optical component can be inserted and housed easily through the insertion port and be protected by closing the cover.

There can be cited an arrangement in which the optical component holding unit is adapted to be arranged and coupled into an optical component holding unit array and includes: an opening portion for allowing passage of incident light to the optical component; and an opening portion for allowing passage of output light from the optical component.

There can also be cited an arrangement in which the optical component holding unit is adapted to be arranged and coupled at the beginning of an optical component holding unit array and includes an opening portion for allowing passage of output light from the optical component.

Furthermore, there can also be cited an arrangement in which the optical component holding unit is adapted to be arranged and coupled at the terminal of an optical component holding unit array and includes an opening portion for allowing passage of incident light to the optical component.

It is noted that the meaning of the circular or noncircular hole here includes a through hole, groove, or recessed portion.

Effect of the Invention

In accordance with the optical component holding unit according to the present invention, the positioning accuracy in the three-dimensional direction as well as in the rotation direction can be improved while reducing cost in assembling based on facilitated positioning in the three-dimensional direction as well as in the rotation direction and ensuring positional reproducibility based on detachable coupling between optical component holding units.

2a, 2b, 12a, 12b, 22a, 22b, and 42b . . . Opening portions; 4a, 4b, 14a, 14b, 24a, 24b, 34a, and 34b . . . Fitting shapes; 5, 15, 25, and 35 . . . Optical component holding units; 6 . . . Cover; 8a . . . Rectangular convex portion (noncircular convex portion); 8b and 48b . . . Rectangular holes (noncircular holes); 11a . . . Circular convex portion; 11b . . . Circular hole; 13a . . . Spring pin (fitting pin); 13b . . . Fitting hole.

BEST MODES FOR CARRYING OUT THE INVENTION

Figure 1:
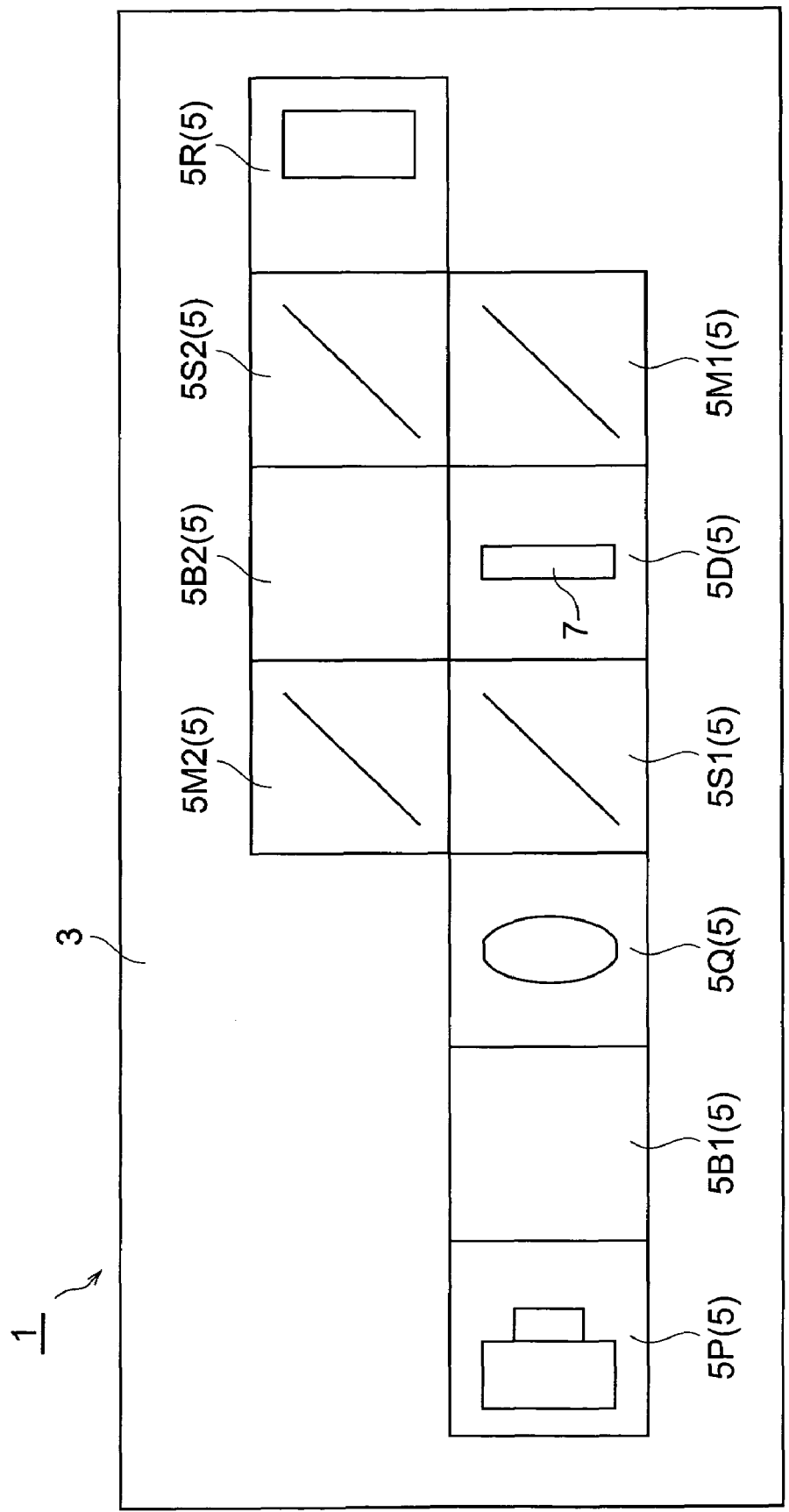
FIG. 1 is a schematic planar block diagram showing a Mach-Zehnder interferometer provided with optical component holding units according to a first embodiment of the present invention.
Figure 2:
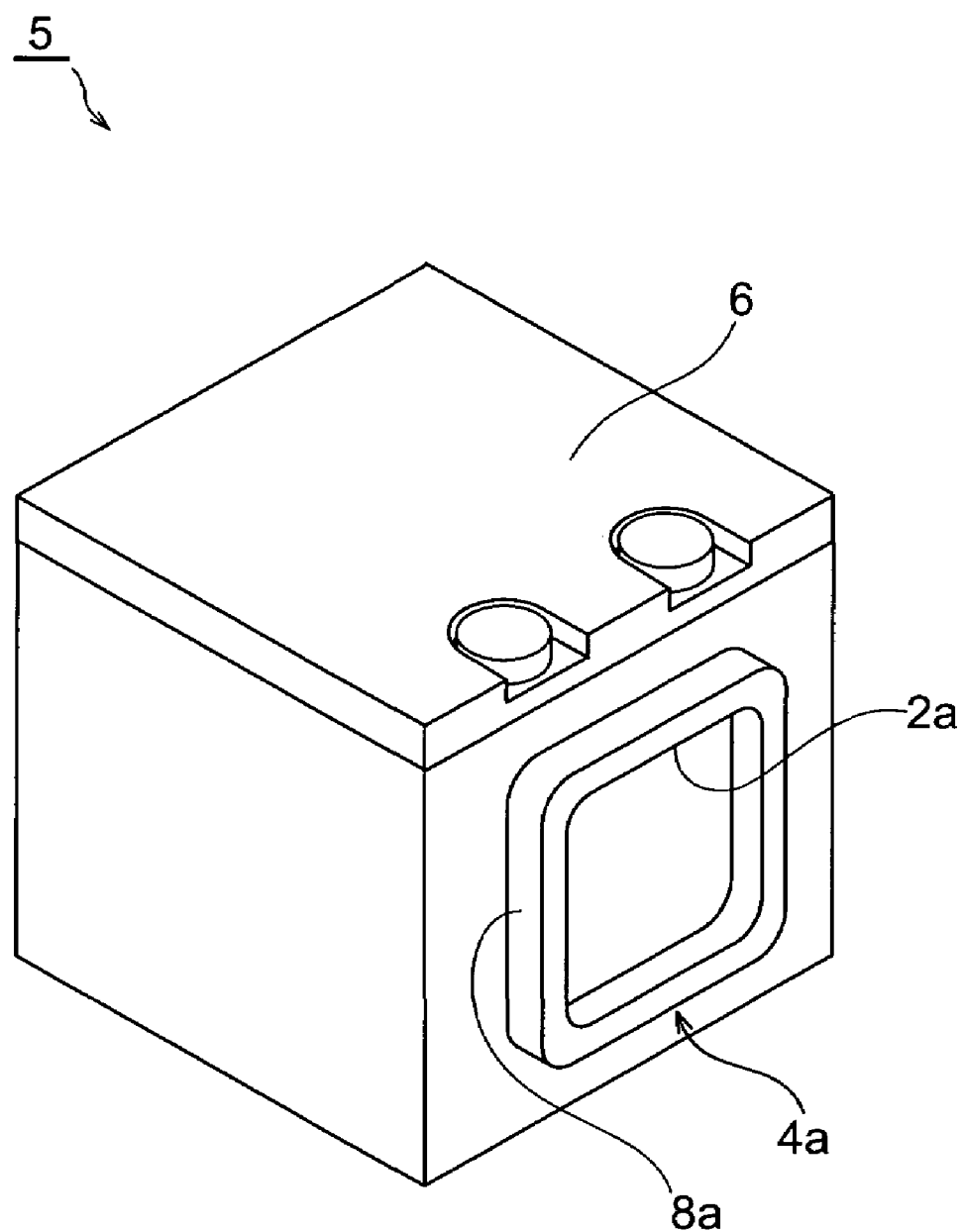
FIG. 2 is a perspective view showing an optical component holding unit in FIG. 1.
Figure 3:
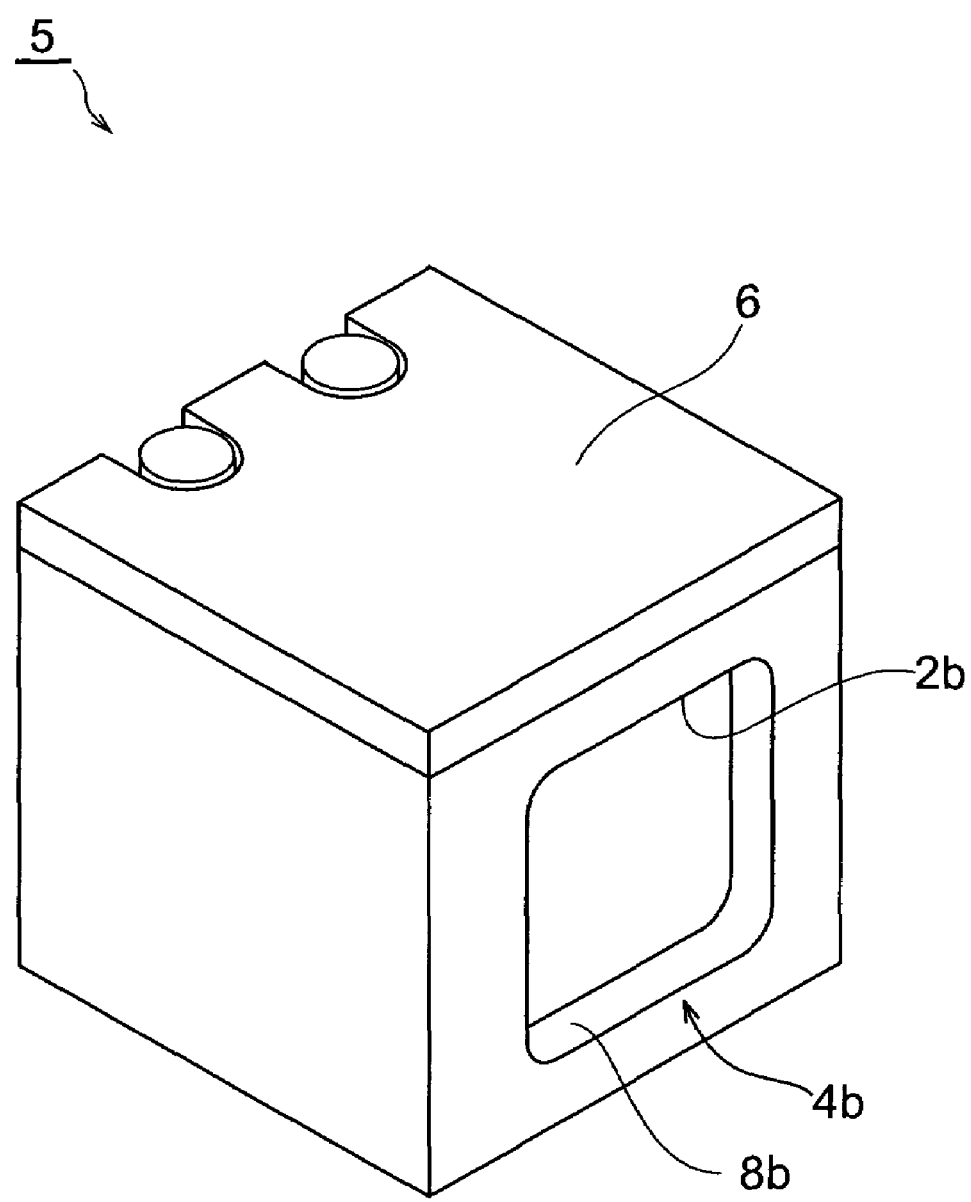
FIG. 3 is a perspective view showing an optical component holding unit to be coupled to the optical component holding unit shown in FIG. 2.

An optical component holding unit according to a preferred first embodiment of the present invention will hereinafter be described with reference to FIG. 1 to FIG. 3. FIG. 1 is a schematic planar block diagram showing a Mach-Zehnder interferometer provided with optical component holding units according to the first embodiment of the present invention, and FIG. 2 and FIG. 3 are perspective views showing optical component holding units in FIG. 1. It is noted that in the descriptions of the drawings, identical or equivalent elements are designated by the same reference numerals to omit redundant description.

As shown in FIG. 1, the Mach-Zehnder interferometer 1, which is used for, for example, measuring the amount of distortion of a transparent body, includes a mounting base 3 and various optical component holding units (hereinafter described in detail) 5.

The mounting base 3 is made of metal such as aluminum and is a substrate formed in a plate shape.

The various optical component holding units 5 are mounted on the mounting base 3. Specifically, the optical component holding units 5 are a light-emitting unit 5P with a light-emitting element housed therein, blank units 5B1 and 5B2 with no optical component housed therein, a lens unit 5Q with a collimating lens housed therein, beam splitter units 5S1 and 5S2 with a beam splitter housed therein, a to-be-examined object unit 5D with a to-be-examined object 7 housed therein, mirror units 5M1 and 5M2 with a mirror housed therein, and a light-receiving unit 5R with a light-receiving element housed therein, these units being collectively referred to as the optical component holding units 5. The optical component holding units 5 are bonded onto the mounting base 3 via, for example, an adhesive.

The light-emitting unit 5P, blank unit 5B1, lens unit 5Q, beam splitter unit 5S1, to-be-examined object unit 5D, and mirror unit 5M1 are placed coaxially in a coupled manner in an array, while the mirror unit 5M2, blank unit 5B2, beam splitter unit 5S2, and light-receiving unit 5R are also placed coaxially in a coupled manner in another array. The optical component holding unit arrays are placed parallel and coupled to each other so that the mirror surfaces of the beam splitter unit 5S1 and the mirror unit 5M2 face each other and the mirror surfaces of the mirror unit 5M1 and the beam splitter unit 5S2 face each other. In this arrangement, light emitted from the light-emitting unit 5P is collimated in the lens unit 5Q and divided in the beam splitter unit 5S1 into a straight light toward the mirror unit 5M1 and reflected light toward the mirror unit 5M2. The straight light from the beam splitter unit 5S1 transmits through the to-be-examined object 7 to be reflected to a right angle at the mirror unit 5M1, while the reflected light from the beam splitter unit 5S1 is reflected to a right angle at the mirror unit 5M2. The light from the mirror units 5M1 and 5M2 reaches the beam splitter unit 5S2 to be received at the light-receiving unit 5R via the beam splitter unit 5S2. Then, the light-receiving unit 5R detects an interference pattern to measure the amount of distortion of the to-be-examined object 7.

The optical component holding units 5 are made of, for example, brass and each have a cubic shape (block body) as shown in FIG. 2 and FIG. 3, being capable of housing and holding an optical component such as the light-emitting element, collimating lens, beam splitter, mirror, or light-receiving element and including opening portions 2a and 2b for allowing passage of light and fitting shapes (positioning fitting shape and anti-rotation fitting shape) 4a and 4b for coupling optical component holding units 5 adjacent in the direction of the light detachably to each other in peripheral surfaces. It is noted that the optical component holding units 5 to be described here each include at least two opening portions, corresponding to the lens unit 5Q, mirror units 5M1 and 5M2, to-be-examined object unit 5D, and blank units 5B1 and 5B2. The optical component holding units 5Q, 5D, 5B1, and 5B2 each include opening portions 2a and 2b in peripheral surfaces facing each other, while the optical component holding units 5M1 and 5M2 each include opening portions 2a and 2b in peripheral surfaces perpendicular to each other.

As shown in FIG. 2, the fitting shape 4a includes a rectangular convex portion 8a surrounding the rectangular opening portion 2a and protruding outward as a noncircular convex portion. Meanwhile, as shown in FIG. 3, the fitting shape 4b includes a rectangular hole 8b forming the opening portion 2b as a noncircular hole.

Further, the optical component holding units 5 are each provided with an insertion port (not shown in the figures) for inserting an optical component therethrough and a cover 6 for opening and closing the insertion port as shown in FIG. 2 and FIG. 3. The cover 6 is fixed to each optical component holding unit 5 using, for example, screws and the screws are arranged not to protrude from the cover 6.

It is noted that the light-emitting unit 5P and the light-receiving unit 5R are only required to have at least one opening portion, while the beam splitter units 5S1 and 5S2 are only required to have at least three opening portions.

In the thus arranged optical component holding units 5, the fitting between the rectangular convex portion 8a and the rectangular hole 8b guides adjacent optical component holding units 5 to predetermined positions and couples the units detachably to each other for positioning in the three-dimensional direction, and also restrains the adjacent optical component holding units 5 relatively in the rotation direction for positioning in the rotation direction. It is therefore possible to improve the positioning accuracy in the three-dimensional direction as well as in the rotation direction while reducing cost through facilitated assembling and ensuring positional reproducibility based on detachable coupling between optical component holding units 5.

Also, each optical component holding unit 5, which has a cubic shape, can be brought into close contact with reference planes such as the mounting base 3 and peripheral surfaces of adjacent optical component holding units 5. It is therefore possible to arrange the optical component holding units accurately with respect to each other.

Further, since the insertion port for inserting an optical component therethrough and the cover 6 for opening and closing the insertion port are provided, the optical component can be inserted and housed easily through the insertion port and be protected reliably by closing the cover 6.

Figure 4:
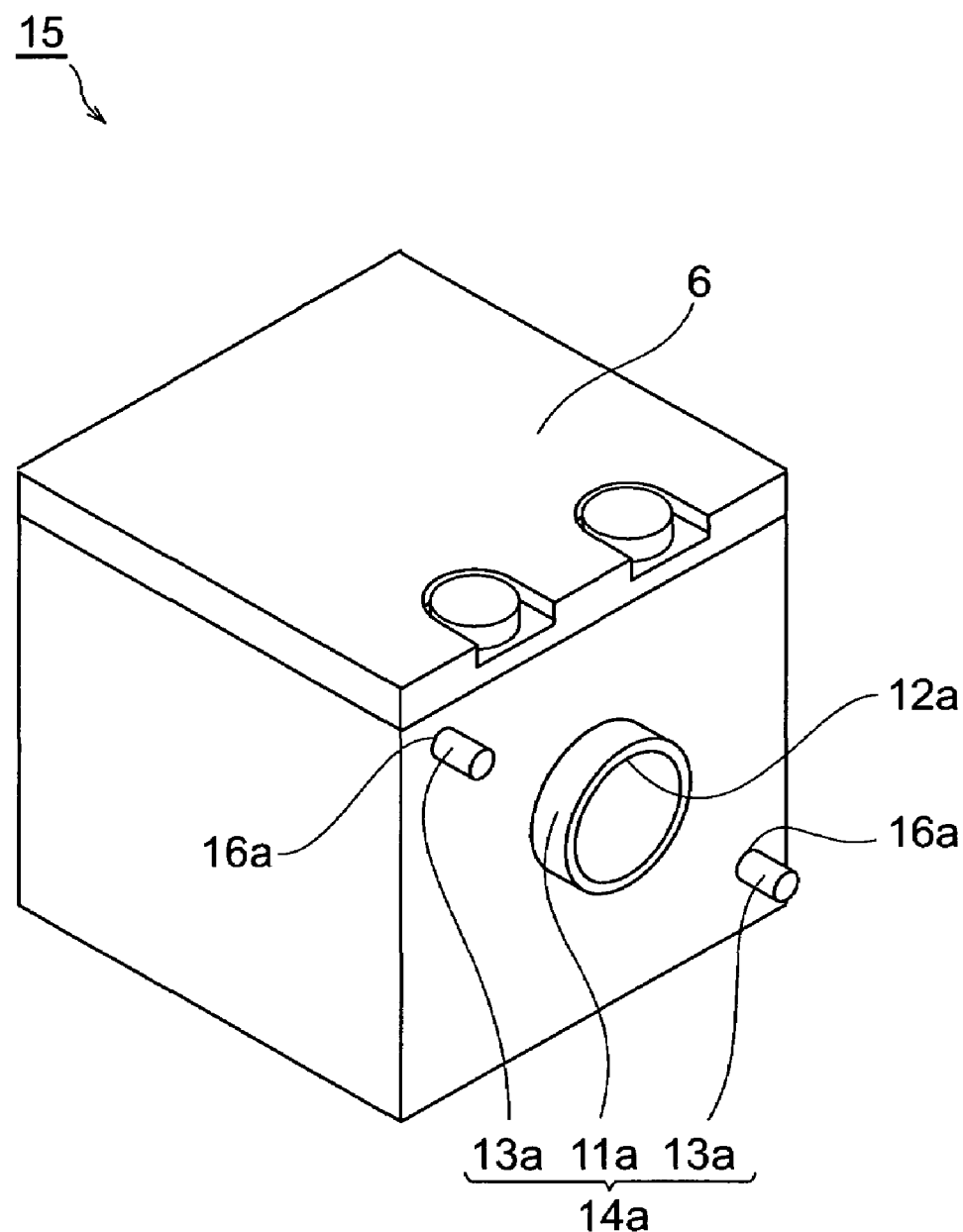
FIG. 4 is a perspective view showing an optical component holding unit according to a second embodiment of the present invention.
Figure 5:
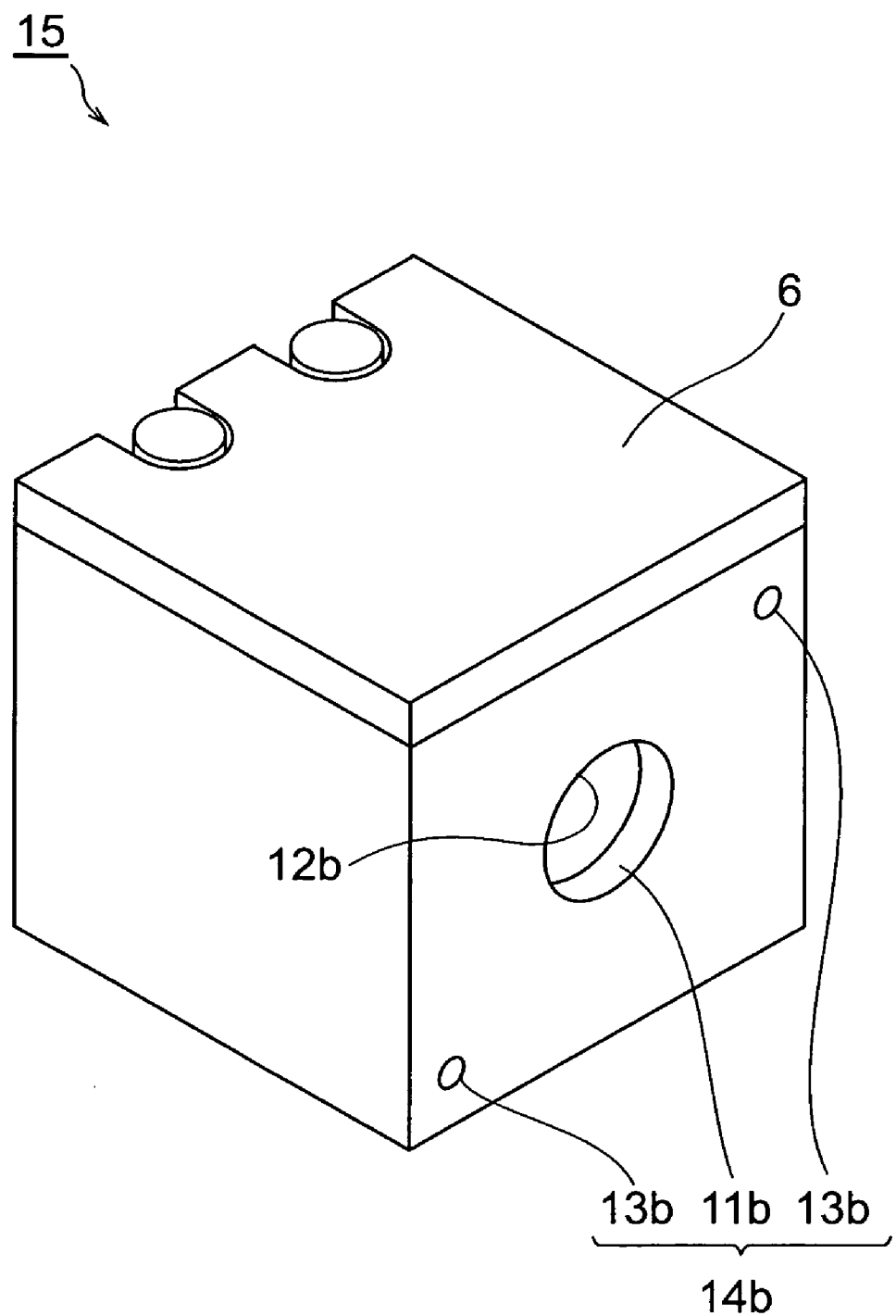
FIG. 5 is a perspective view showing an optical component holding unit to be coupled to the optical component holding unit shown in FIG. 4.

FIG. 4 and FIG. 5 are perspective views showing optical component holding units according to a second embodiment of the present invention. The optical component holding units 15 according to the second embodiment are different from the optical component holding units 5 according to the first embodiment in that instead of the fitting shapes 4a and 4b including, respectively, the rectangular convex portion 8a and the rectangular hole 8b, there are used fitting shapes 14a and 14b including, respectively, a circular convex portion 11a and a circular hole 11b as a positioning fitting shape as well as spring pins 13a and fitting holes 13b as an anti-rotation fitting shape.

As shown in FIG. 4, the circular convex portion 11a surrounds a circular opening portion 12a and protrudes outward, while as shown in FIG. 5, the circular hole 11b forms an opening portion 12b.

The spring pins 13a are made of, for example, stainless steel and have a split groove extending axially in the peripheral surface thereof, the pins being inserted, respectively, in a pair of support holes 16a that are arranged diagonally across the opening portion 12a as shown in FIG. 4. Also, as shown in FIG. 4 and FIG. 5, the fitting holes 13b are provided in the positions facing the respective support holes 16a.

In accordance with the thus arranged second embodiment, the fitting between the circular convex portion 11a and the circular hole 11b guides optical component holding units 15 to predetermined positions and couples the units detachably to each other for positioning in the three-dimensional direction, while the fitting between the spring pins 13a and the fitting holes 13b restrains the units relatively in the rotation direction for positioning in the rotation direction. It is therefore possible to exhibit the same effects as in the first embodiment.

Moreover, the spring pins 13a have an outside diameter of 1.6 mm and a length of 5 mm; the support holes 16a have an inside diameter of 1.54 mm and a depth of 2 mm; the fitting holes 13b have an inside diameter of 1.66 mm and a depth of 3.5 mm. Thus, when the fitting between the optical component holding units 15 is released, the spring pins 13a cannot be left in the corresponding fitting holes 13b to remain inserted in the support holes 16a, which allows for highly accurate positioning in the rotation direction when coupling the optical component holding units 15 again, resulting in ensuring reproducibility.

Figure 6:
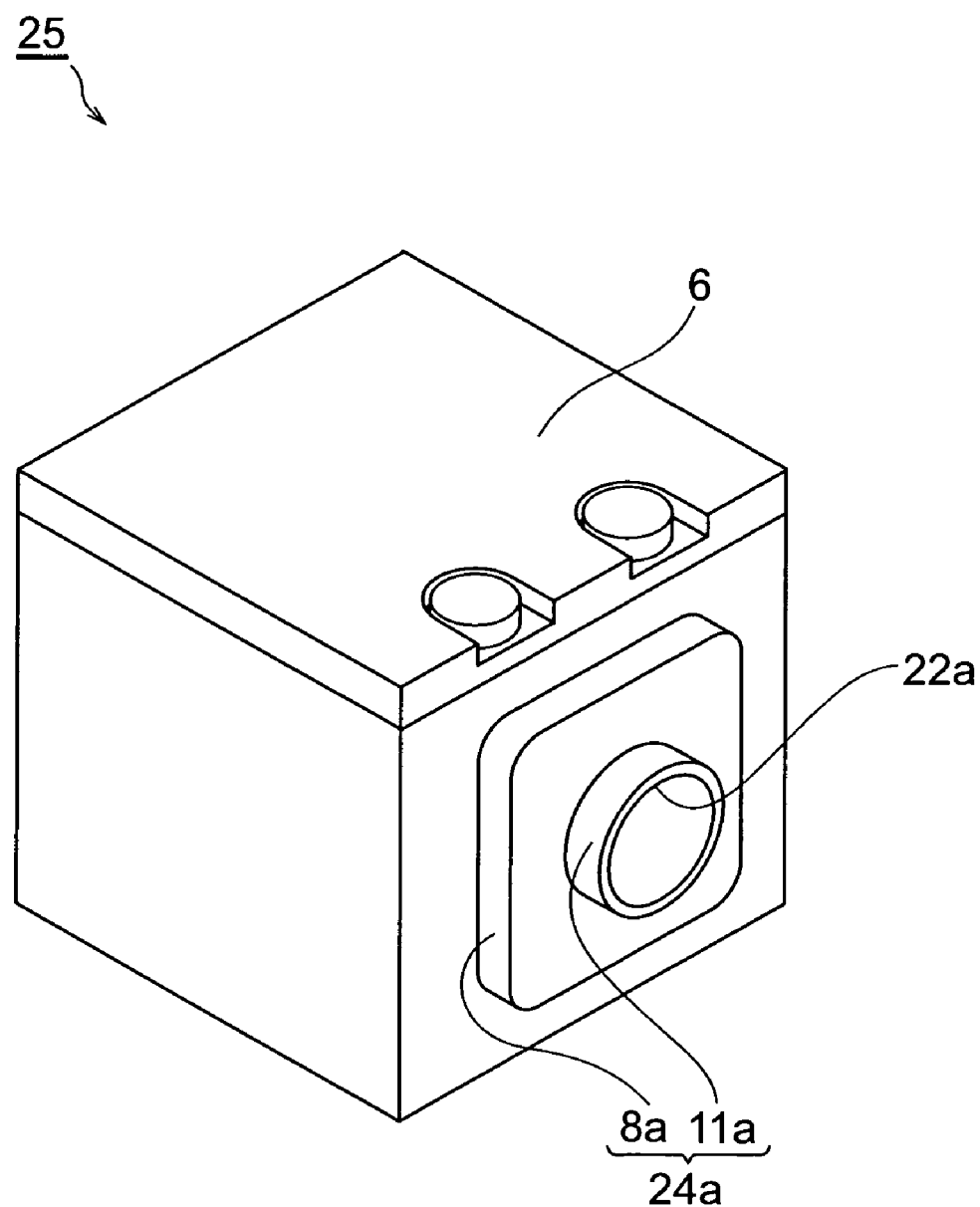
FIG. 6 is a perspective view showing an optical component holding unit according to a third embodiment of the present invention.
Figure 7:
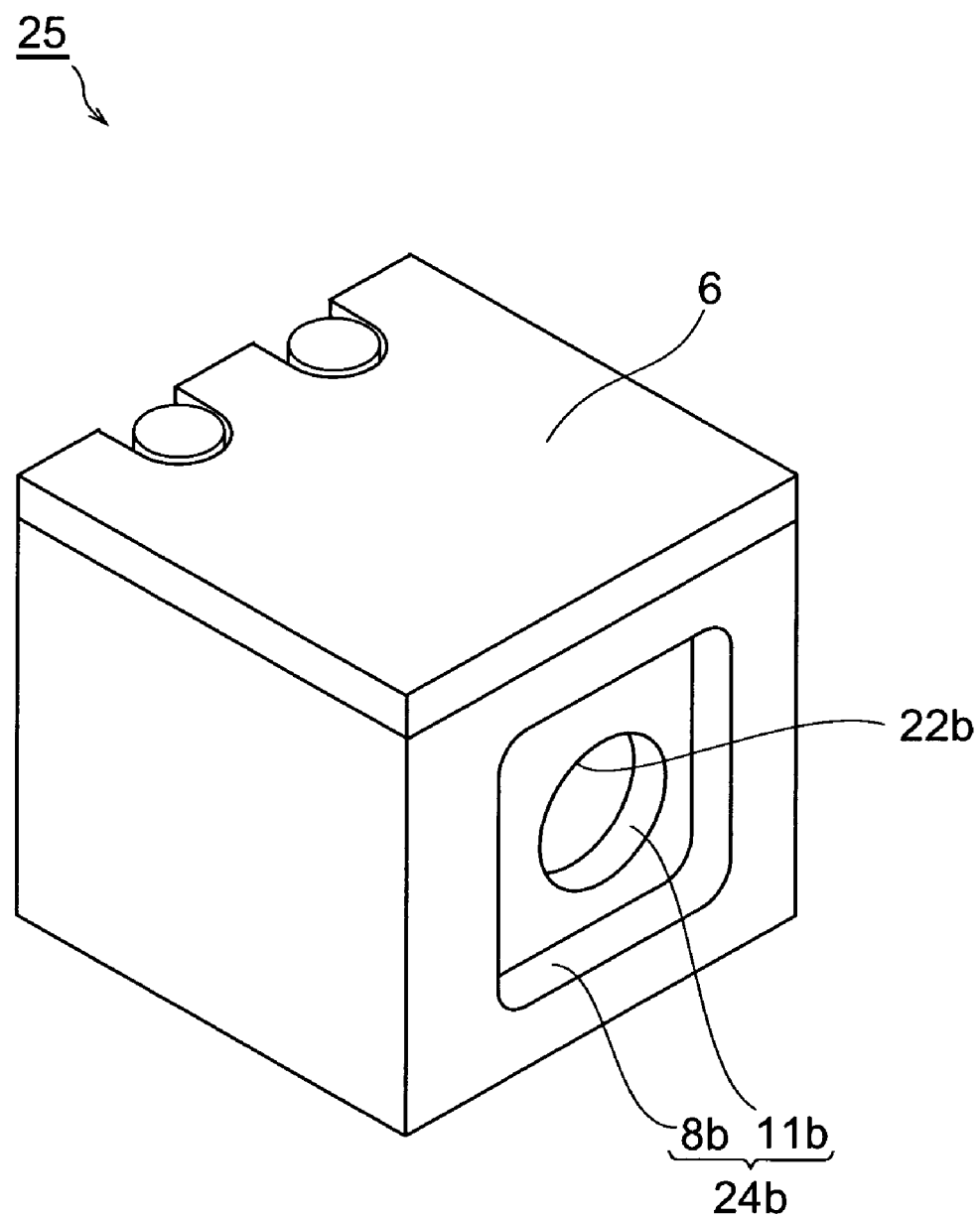
FIG. 7 is a perspective view showing an optical component holding unit to be coupled to the optical component holding unit shown in FIG. 6.

FIG. 6 and FIG. 7 are perspective views showing optical component holding units according to a third embodiment of the present invention. The optical component holding units 25 according to the third embodiment are different from the optical component holding units 5 according to the first embodiment in that the fitting shapes 24a and 24b of the optical component holding units 25 further include, respectively, a circular convex portion 11a and a circular hole 11b as a positioning fitting shape. That is, as shown in FIG. 6, the fitting shape 24a includes the circular convex portion 11a surrounding a circular opening portion 22a inside (on the axial center side of) the rectangular convex portion 8a, while as shown in FIG. 7, the fitting shape 24b includes the circular hole 11b forming an opening portion 22b inside (on the axial center side of) the rectangular hole 8b.

In accordance with the thus arranged third embodiment, not only the fitting between the rectangular convex portion 8a and the rectangular hole 8b but also the fitting between the circular convex portion 11a and the circular hole 11b guides optical component holding units 25 to predetermined positions for more reliable positioning in the three-dimensional direction. It is therefore possible to improve the positioning accuracy in the three-dimensional direction relative to the first embodiment.

It is noted that in the foregoing embodiment, although the fitting shape 24a including the circular convex portion 11a inside the rectangular convex portion 8a and the fitting shape 24b including the circular hole 11b inside the rectangular hole 8b are provided, a fitting shape including a rectangular convex portion inside a circular convex portion and a fitting shape including a rectangular hole inside a circular hole may be provided.

Figure 8:
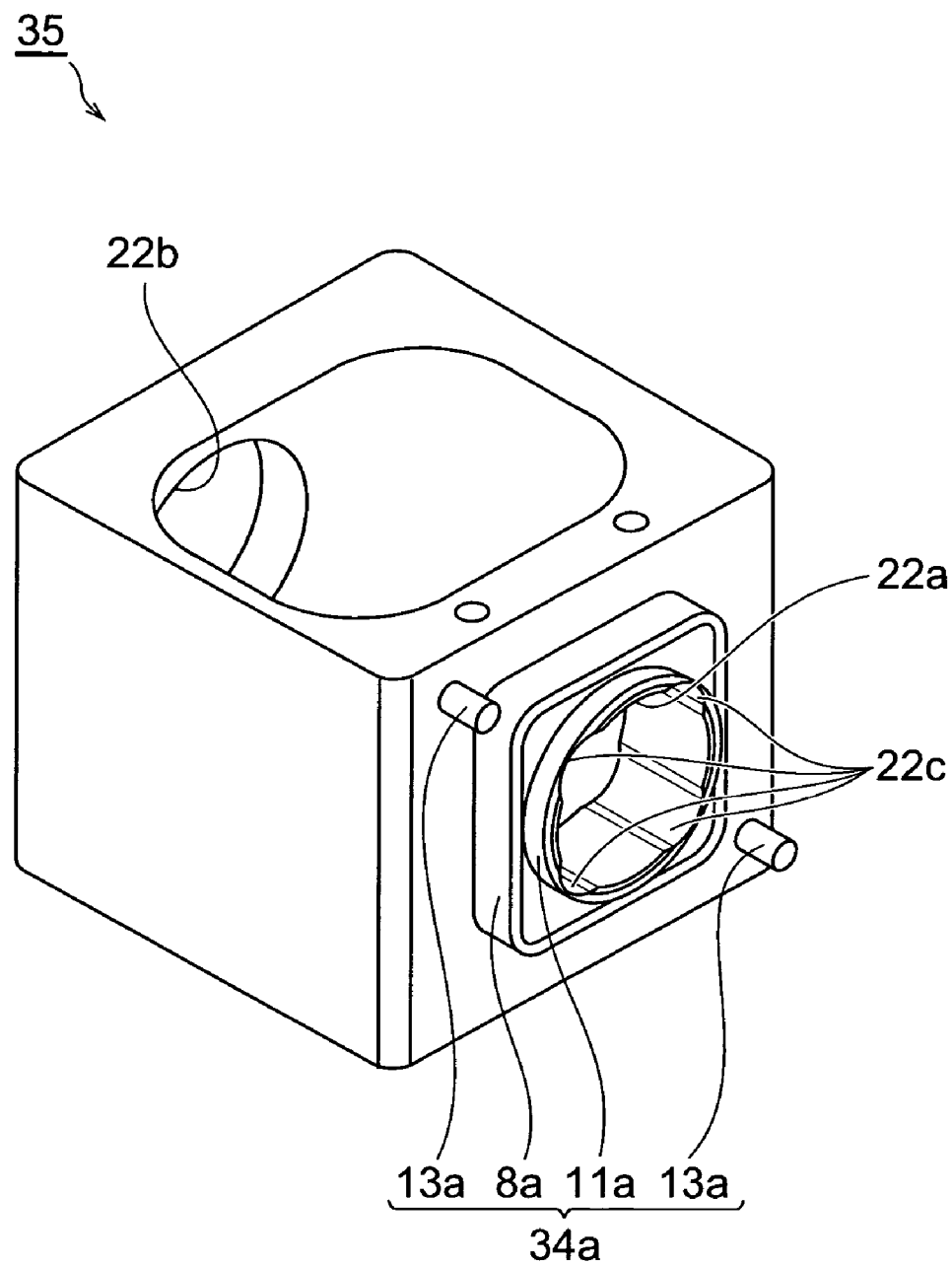
FIG. 8 is a perspective view showing an optical component holding unit according to a fourth embodiment of the present invention before a cover being attached thereto.
Figure 9:
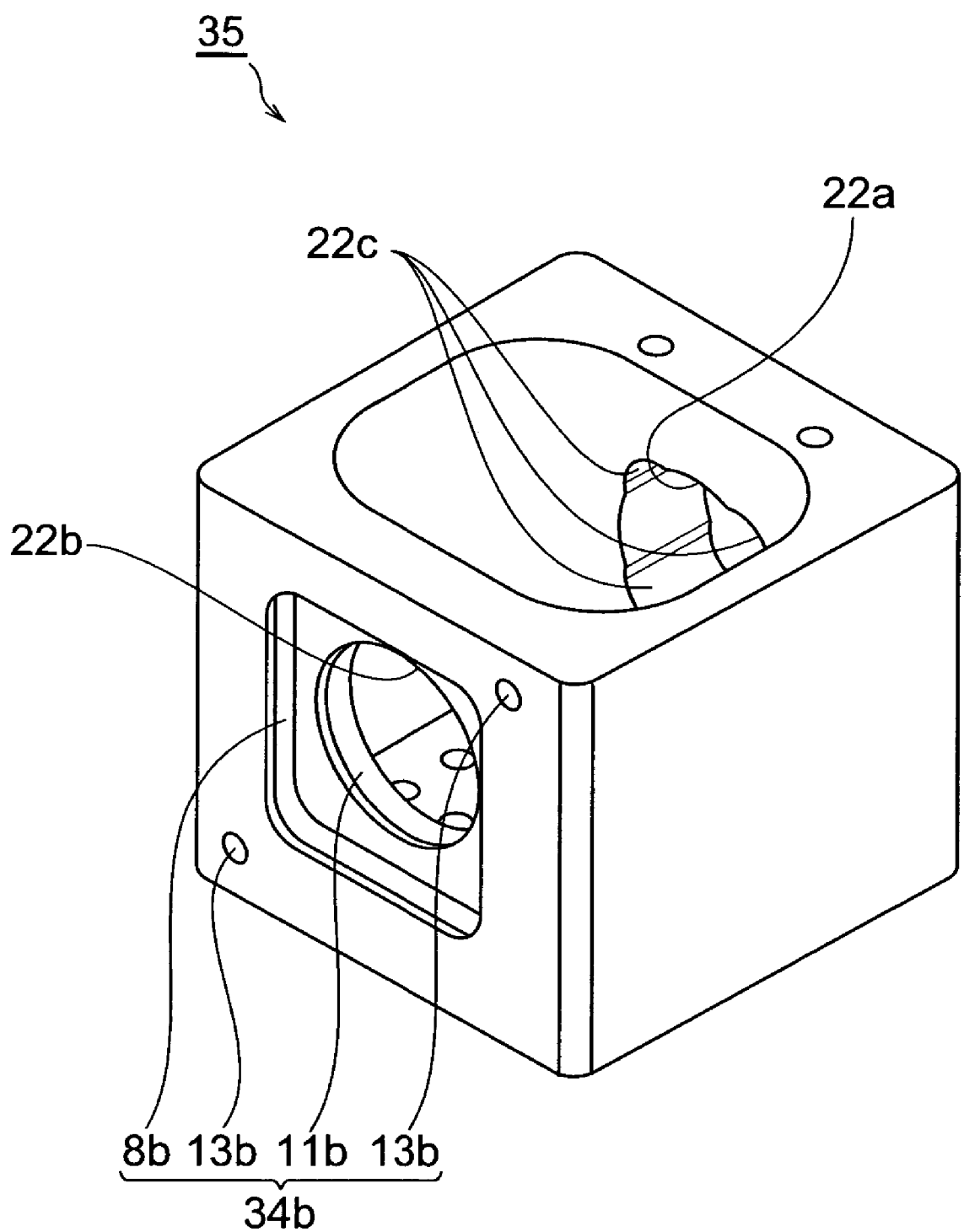
FIG. 9 is a perspective view showing an optical component holding unit to be coupled to the optical component holding unit shown in FIG. 8 before a cover being attached thereto.

FIG. 8 and FIG. 9 are perspective views showing optical component holding units according to a fourth embodiment of the present invention before a cover being attached thereto. The optical component holding units 35 according to the fourth embodiment are different from the optical component holding units 25 according to the third embodiment in that the fitting shapes 34a and 34b of the optical component holding units 35 further include, respectively, spring pins 13a (refer to FIG. 8) and fitting holes 13b (refer to FIG. 9) as an anti-rotation fitting shape.

Also, the opening portion 22a includes runout portions 22c for allowing entering and retreating of a tool through the opening portion 22a or 22b in the peripheral surface thereof to process the circular convex portion 11a, rectangular convex portion 8a, circular hole 11b, and rectangular hole 8b on the same axis simultaneously and accurately from one direction. It is noted that the runout portions 22c can be applied to the other embodiments.

In accordance with the thus arranged fourth embodiment, not only the fitting between the rectangular convex portion 8a and the rectangular hole 8b but also the fitting between the spring pins 13a and the fitting holes 13b restrains the optical component holding units 35 relatively in the rotation direction for more reliable positioning in the rotation direction. It is therefore possible to improve the positioning accuracy in the rotation direction relative to the third embodiment.

Although the present invention has specifically been described based on the embodiments, the present invention is not restricted to the above-described embodiments. The optical component holding units 5, 15, 25, and 35, which are applied to the Mach-Zehnder interferometer 1, can also be applied to, for example, a Fourier transform spectrometer or a flatness measuring device.

Also, the light-receiving element, collimating lens, beam splitters, mirrors, and light-receiving element are exemplified as optical components in the above-described embodiments, but not restricted thereto, and various prisms, various filters, and/or spatial light modulators may be used, for example. Further, the optical component holding units are not necessarily required to house an optical component, and may be used as, for example, a blank unit with no optical component housed therein or a to-be-examined object unit for housing a to-be-examined object.

Further, in the above-described embodiments, although the cross-sectionally rectangular-shaped rectangular convex portion 8a and rectangular hole 8b are provided as a noncircular convex portion and noncircular hole, a cross-sectionally elliptical-shaped elliptical convex portion and elliptical hole or a cross-sectionally polygonal-shaped polygonal convex portion and polygonal hole may be provided, for example.

Figure 10:
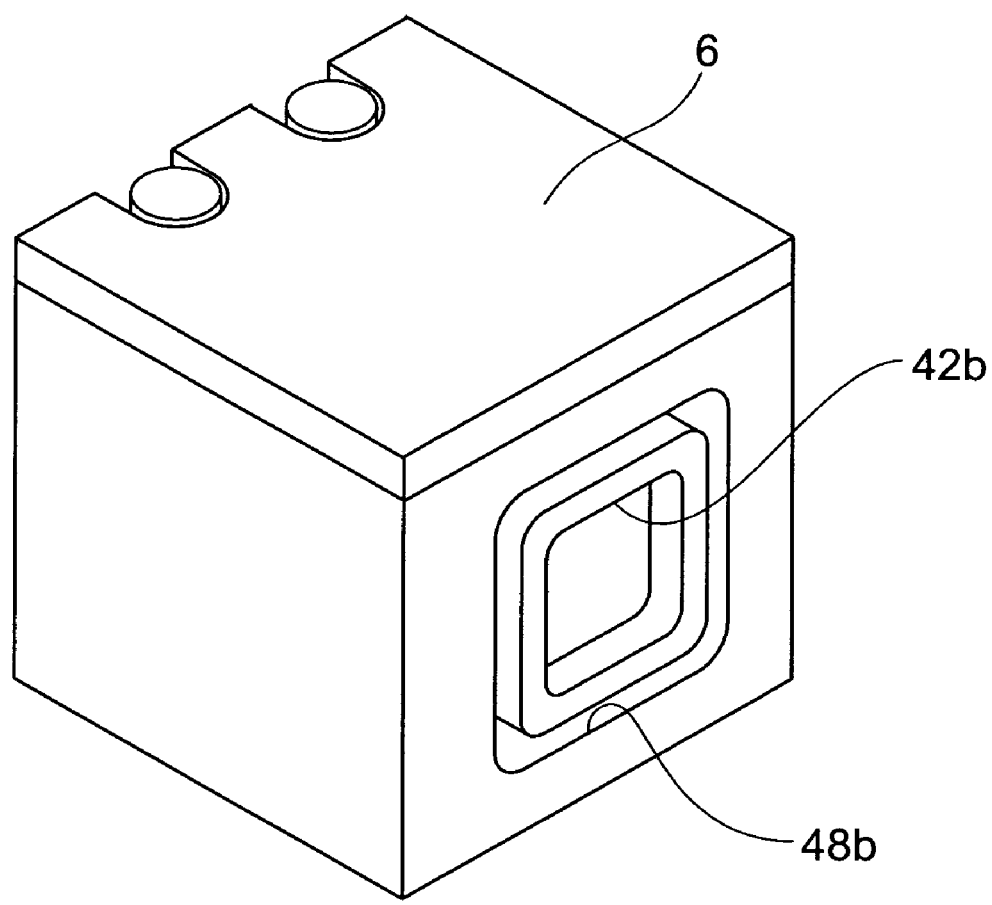
FIG. 10 is a perspective view for illustrating a hole in each optical component holding unit according to the first to fourth embodiments of the present invention.

Furthermore, in the above-described embodiments, although the noncircular hole 8b and circular hole 11b as positioning fitting shapes are arranged to form the opening portions 2b, 12b, 22b, or 22b, the holes may be, for example, an annular groove 48b surrounding an opening portion 42b as shown in FIG. 10, or may be a recessed portion provided consecutively on the outer periphery of an opening portion to surround the opening portion and not reaching the inner side (inside the block).

In addition, the optical component holding units 5, 15, 25, and 35, which have a cubic shape in the above-described embodiments, may have, for example, a rectangular parallelepiped shape or other polyhedron shapes.

Also, the axial center of a fitting shape and the center of the peripheral surface in which the fitting shape is provided may not be aligned. In accordance with this arrangement, if there is an undesired positional relationship (in the rotation direction) when coupling the optical component holding units 5, 15, 25, and 35 to each other, there occur some differences in level, which allows the undesired positional relationship to be recognized easily.

Further, in the above-described embodiments, although the fitting shape for coupling optical component holding units to each other and the cover 6 are arranged separately, the fitting shape may be provided in the cover 6.

Moreover, in the second and fourth embodiments, although the pair of spring pins 13a are provided on the peripheral surface on which the circular convex portion 11a is provided and the pair of fitting holes 13b are provided in the peripheral surface in which the circular hole 11b is provided, the spring pins 13a and the fitting holes 13b may be provided in the same peripheral surface, and other elastic pin types may be used instead of the spring pins 13a.

INDUSTRIAL APPLICABILITY

In accordance with the optical component holding unit according to the present invention, the positioning accuracy in the three-dimensional direction as well as in the rotation direction can be improved while reducing cost in assembling based on facilitated positioning in the three-dimensional direction as well as in the rotation direction and ensuring positional reproducibility based on detachable coupling between optical component holding units.

The invention claimed is:

1. An optical component holding unit capable of housing and holding an optical component, comprising:
   an opening portion for allowing passage of light and a fitting shape capable of coupling optical component holding units adjacent in the direction of the light detachably to each other,
   the fitting shape comprising:
   a positioning fitting shape for forming or surrounding the opening portion to position the optical component holding units with respect to each other; and
   an anti-rotation fitting shape for preventing relative rotation between the optical component holding units.

2. The optical component holding unit according to claim 1, wherein the positioning fitting shape and the anti-rotation fitting shape comprise a cross-sectionally noncircular-shaped noncircular hole or noncircular convex portion for forming or surrounding the opening portion.

3. The optical component holding unit according to claim 2, wherein the positioning fitting shape further comprises a cross-sectionally circular-shaped circular hole or circular convex portion for forming or surrounding the opening portion.

4. The optical component holding unit according to claim 3, wherein the anti-rotation fitting shape further comprises at least either a fitting pin or a fitting hole.

5. The optical component holding unit according to claim 1, wherein
   the positioning fitting shape comprises a cross-sectionally circular-shaped circular hole or circular convex portion for forming or surrounding the opening portion, and
   the anti-rotation fitting shape comprises at least either a fitting pin or a fitting hole.

6. The optical component holding unit according to claim 1, being a block body.

7. The optical component holding unit according to claim 1, further comprising:
   an insertion port capable of inserting the optical component therethrough; and
   a cover for opening and closing the insertion port.

8. The optical component holding unit according to claim 1, adapted to be arranged and coupled into an optical component holding unit array and comprising:
   an opening portion for allowing passage of incident light to the optical component; and
   an opening portion for allowing passage of output light from the optical component.

9. The optical component holding unit according to claim 1, adapted to be arranged and coupled at the beginning of an optical component holding unit array and comprising an opening portion for allowing passage of output light from the optical component.

10. The optical component holding unit according to claim 1, adapted to be arranged and coupled at the terminal of an optical component holding unit array and comprising an opening portion for allowing passage of incident light to the optical component.

* * * * *